June 2, 1964     A. WILSON     3,135,448
APPARATUS FOR TRANSVERSELY TAUTENING A LENGTH OF WEB MATERIAL
Filed Jan. 8, 1962     3 Sheets-Sheet 1

INVENTOR
AUBREY WILSON

BY Cushman, Darby & Cushman
ATTORNEYS

June 2, 1964                 A. WILSON                     3,135,448
        APPARATUS FOR TRANSVERSELY TAUTENING A LENGTH OF WEB MATERIAL
Filed Jan. 8, 1962                                    3 Sheets-Sheet 3

INVENTOR
AUBREY WILSON

United States Patent Office 3,135,448
Patented June 2, 1964

3,135,448
APPARATUS FOR TRANSVERSELY TAUTENING A LENGTH OF WEB MATERIAL
Aubrey Wilson, St. Albans, England, assignor to Imperial Chemical Industries Limited, London, England, a corporation of Great Britain
Filed Jan. 8, 1962, Ser. No. 164,803
3 Claims. (Cl. 226—186)

This invention relates to handling sheet-like materials such as lengths of cloth, paper, plastic films and the like. It particularly relates to handling tubes of plastic film.

When sheet like materials are passed between the nip of nip rollers there is a tendency to crease them. This tendency is particularly marked when plastic films are passed between nip rollers and more particularly when a sheet of plastic film sags in its centre. For geometrical reasons such sagging arises in the tubular film process as a result of the path length along the centre being longer than the path length along the edges of the tube when laid flat, when an inflated tube is collapsed to give "lay-flat" film.

The object of this invention is to apply a transverse (to the machine direction) tautening to a sheet like material when it is passed between nip rollers. A further object of this invention, in an application to tautening "lay-flat" film immediately after collapsing an inflated tube, is at least partially to compensate for the path length differences normally resulting from the collapsing in order to reduce the sagging referred to above.

This invention provides a method of transversely tautening and hauling off sheet like materials in which the sheet is passed between nip rollers, characterised in that the edges of the sheet material e.g. a collapsed tube of plastic film are hauled-off by the nip of the rollers at a speed fractionally greater than the centre of the sheet material. In the application of this invention to tubes of plastic film the speeds of haul off are chosen at least partially to compensate for the above mentioned path length differences to thereby reduce sag. Fractionally greater means greater by a small amount, e.g. up to 10% greater.

This invention also provides pairs of rollers constructed to mate in nipping relationship with each other, the rollers being constructed so that the peripheral speed at nip when the rollers are mated, is greater at the ends of the rollers than at the centre.

Such rollers may be constructed in at least the following three ways:

(1) By having two rollers of about the same diameter when not compressed together; the one roller having elastically yieldable end portions which are freely rotatable relatively to the central portion, the said central portion being non yieldable, while the other roller has an elastically yieldable centre portion and non yieldable end portions; the elastically yieldable end portions of the one roller overlapping the elastically yieldable centre portion of the other roller so that an abrupt discontinuity between the parts of the nip having different peripheral speeds is substantially avoided.

(2) By constructing the one roller of a non yieldable material and so that it has a concave profile and therefore has a larger diameter at the ends than the centre; and by constructing the other roller so that it has at least an outer portion of an elastically yieldable material and shaped to have a convex profile which mates with the concave profile of the said one roller.

(3) By making both rollers shaped with an anticlastic form. An anticlastic form is defined herein as that generated from two circular end plates connected by straight lines perpendicular to them, by twisting the two end plates relatively to each other. A longitudinal cross section of such a roll then has curved edges, but straight lines connect the ends of such a roll at small angles to its axis while its lateral cross sections are circular. The axes of two anticlastic rolls can be at an angle to each other so that they form a line of contact which is the line of the nip when they are used as nip rollers. The rollers will normally be rubber surfaced and need not be inclined to form a perfect line of contact. By varying the angle the bite of the nip can be varied across the rollers and thus to some extent the variation of peripheral speed along the nip can be controlled.

Nip rollers and the use of them in accordance with this invention are now described illustrating the above three methods of forming the rollers.

Figure 1:
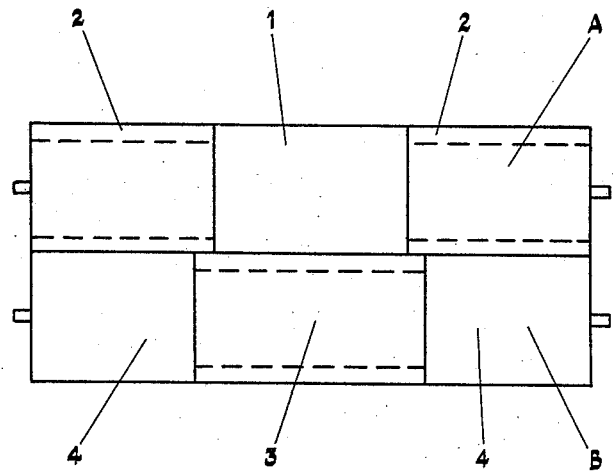
FIGURE 1 shows a side view of a pair of nip rollers formed according to (1) above.

In FIGURE 1 roller A has a steel central portion 1, and portions 2 surfaced with rubber which are freely rotatable with respect to the central portion. The roller B has a central portion 3 surfaced with rubber and outer portions 4 of steel. Both rollers A and B have the same diameter when not pressed against each other.

In use the speed of the film through the nip at the centres of the rollers is the speed of the periphery of the centre portion 1, while at the ends the speed of the film through the nip is faster since the roller B rotates slightly faster than roller A. The rubber covered portions of the rollers overlap so that an abrupt discontinuity between the parts of the nip having different peripheral speeds is avoided. By varying the compression between the two rollers the difference between the speeds in the nip between the ends and centre can be varied in accordance with the path length differences to be compensated. Drive for the pair of rollers may be applied to either or both of the rollers.

Figure 2:
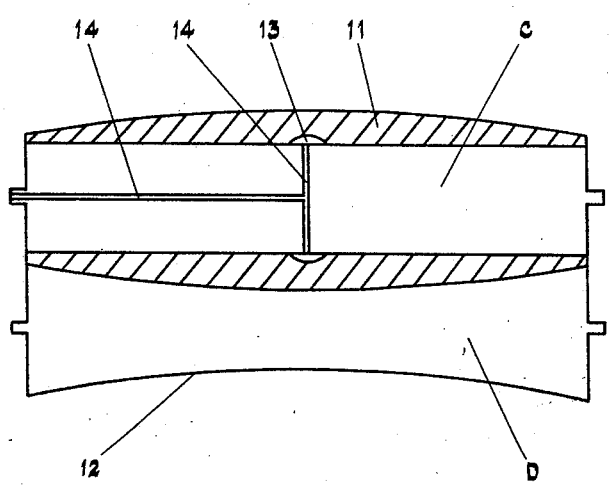
FIGURE 2 shows a longitudinal cross section of a pair of nip rollers formed according to (2) above.

In FIGURE 2 roller C has a surface with a convex rubber sleeve 11 and roller D is made of steel and has a concave surface 12. Either or both of the rollers may be driven. In operation, the film follows the surface of the steel roller D being taken through the nip faster at the edges of the nip rollers than at the centre. It is believed that when the thickness of the rubber is correctly proportioned, the rubber in the central position of the surface of the sleeve 11 undergoes a reverse rolling motion with respect to the surface of the roller D and thereby allows the film to travel through the centre of the nip at the peripheral speed of the roller D.

Figure 3:
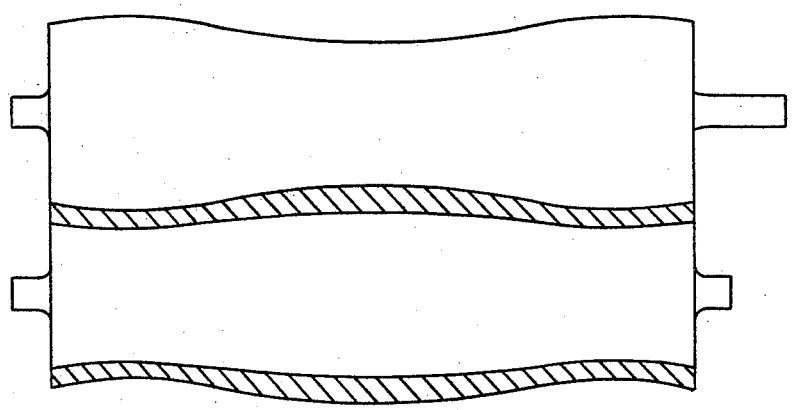
FIGURE 3 shows a longitudinal cross section of a further pair of nip rollers formed according to (2) above.
Figure 4:
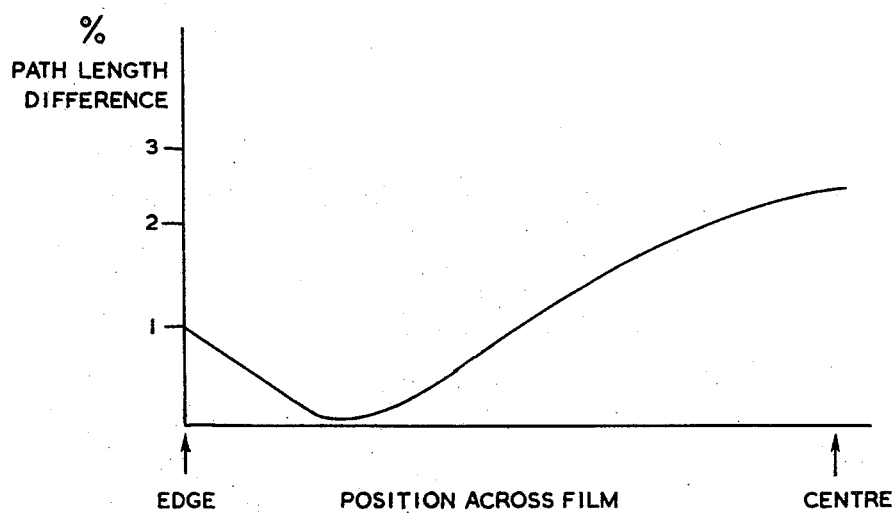
FIGURE 4 illustrates the variations of a typical path length difference across a "lay-flat" film resulting from collapsing it.

FIGURE 3 shows a pair of rollers constructed on the same principle as those of FIGURE 2 but the profile of the rollers is adapted to account for the small increase in path length differences at the extreme edge of a collapsed tube of plastic film by having a small decrease in the diameter of the non-yieldable roller as its end is reached. FIGURE 4 illustrates a typical variation of path length difference with position on the film, which path length differences are compensated for by the rollers in FIGURE 3.

Figure 5:
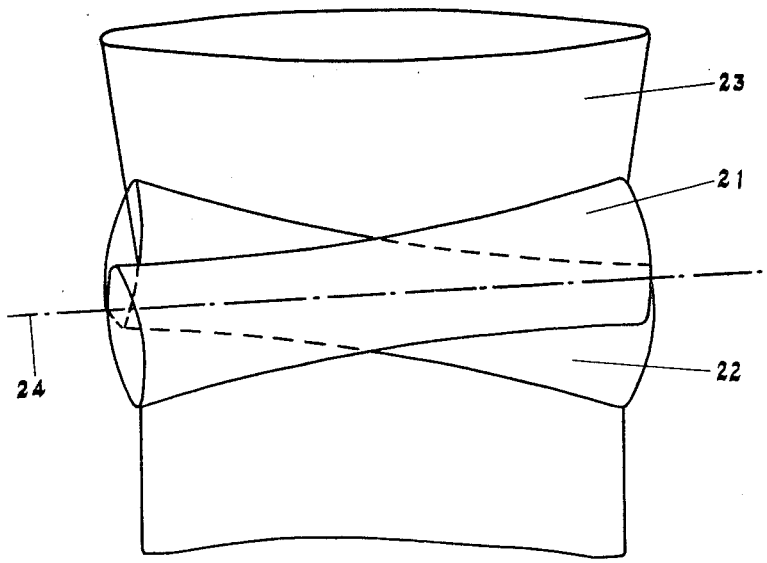
FIGURE 5 shows a side view of a pair of anticlastic rollers formed according to (3) above in use in collapsing and hauling off film.
Figure 6:
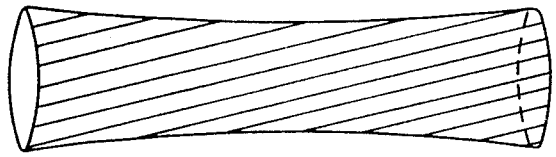
FIGURE 6 illustrates the generation of an anticlastic roller.

FIGURE 5 shows the use of two anticlastic rollers 21 and 22 having a collapsing tube of plastic film 23 fed between them. The chain dotted line 24 shows the line of the nip of the two rollers. The rollers are surfaced with hard rubber and either or both of them may be driven.

It is convenient to control the inflating medium in a heat setting zone by controllably allowing the inflating medium to leak from the stretching zone through a leak portion specially provided in the rollers between the two zones. It is equally convenient to allow exhaust of inflating medium from a heat setting zone through a similar leak section provided in the nip rollers used to haul off film from the heat setting zone. The use of special adjustable leak nip rollers is the subject of our copending British application No. 26,670/56.

FIGURE 2 shows the presence of such an adjustable leak section in roller C which has a circumferential cut out portion 13 in the rubber sleeve 11, which is connected to pressure or vacuum supplied by pipes 14. Conveniently, the other sleeve 11 has the desired profile when connected to a pressure source, release of the pressure causing a leak to develop between the rollers C and D. An adjustable leak section could similarly be provided in one of the rollers of FIGURE 1, or in either of the anticlastic rollers of FIGURE 3 which could be rubber covered for this purpose.

The rollers of this invention may be provided with circumferential grooves to provide a passage for a tubular probe through which an inflating medium can be introduced to inflate the tube of film according to our British Patent No. 787,479. Preferably the circumferential grooves are filled with soft or sponge rubber to enable an effective seal to be maintained.

I claim:

1. Apparatus for reducing sag in a length of sheet material by transversely tautening the same comprising a pair of nip rollers with their peripheral surfaces in contact with each other along a nip line, the shape of said peripheral surfaces and the relative positions of said rollers being such that the peripheral speed at the nip line is greater at the ends of said peripheral surfaces than at their centers whereby sheet material passing between said rollers is transversely tautened, one of said nip rollers being constructed from a non-yielding material and having a concave profile thereby having a larger diameter at its ends than at the centre and the other nip roller being constructed so that it has at least an outer portion of an elastically yieldable material and is shaped to have a convex profile which mates with the concave profile of the said one roller.

2. Apparatus according to claim 1 in which the diameter of said non-yieldable roller is decreased at each end thereof whereby the profile of the rollers is adapted to account for a small increase in path-length differences at the extreme edge of a collapsed tube of plastic film.

3. Apparatus for reducing sag in a length of sheet material by transversely tautening the same comprising a pair of nip rollers with their peripheral surfaces in contact with each other along a nip line, the shape of said peripheral surfaces and the relative positions of said rollers being such that the peripheral speed at the nip line is greater at the ends of said peripheral surfaces than at their centers whereby sheet material passing between said rollers is transversely tautened, one of said nip rollers having elastically yieldable end portions which are freely rotatable relatively to the center portion, the said center portion being non-yieldable, and the other nip roller having an elastically yieldable center portion and non-yieldable end portions, said rollers having about the same diameter when out of contact with each other, the elastically yieldable end portions of the one roller overlapping the elastically yieldable center portion of the other roller so that an abrupt discontinuity between the parts of the nip having different peripheral speeds is substantially avoided when said rollers are in contact with each other.

References Cited in the file of this patent
UNITED STATES PATENTS

| | | |
|---|---|---|
| 1,909,504 | Robbins | May 16, 1933 |
| 2,038,204 | Bidle | Apr. 21, 1936 |
| 2,246,004 | Rich | June 17, 1941 |
| 2,517,067 | Wedler | Aug. 1, 1950 |
| 2,660,380 | Blackman et al. | Nov. 24, 1953 |
| 2,793,856 | Nixon | May 28, 1957 |
| 2,829,208 | Dawkins | Apr. 1, 1958 |
| 2,913,192 | Mullin | Nov. 17, 1959 |
| 2,916,764 | Gerber | Dec. 15, 1959 |
| 2,943,433 | Van Dijk | July 5, 1960 |